(12) United States Patent
Krause et al.

(10) Patent No.: US 8,919,370 B2
(45) Date of Patent: Dec. 30, 2014

(54) TANK FOR STORING A LIQUID ACTIVE INGREDIENT

(75) Inventors: Michael Krause, Trippstadt (DE); Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 977 days.

(21) Appl. No.: 13/061,198

(22) PCT Filed: Jul. 7, 2009

(86) PCT No.: PCT/EP2009/058554
§ 371 (c)(1),
(2), (4) Date: Feb. 28, 2011

(87) PCT Pub. No.: WO2010/023011
PCT Pub. Date: Mar. 4, 2010

(65) Prior Publication Data
US 2011/0168280 A1     Jul. 14, 2011

(30) Foreign Application Priority Data
Aug. 29, 2008   (DE) .................. 10 2008 041 723

(51) Int. Cl.
*F16L 53/00* (2006.01)
*F02M 31/12* (2006.01)
*F01N 3/20* (2006.01)
*B60K 15/03* (2006.01)

(52) U.S. Cl.
CPC ..... *F01N 3/2066* (2013.01); *B60K 2015/03111* (2013.01); *B60K 2015/03348* (2013.01); *F01N 2610/10* (2013.01); *F01N 2610/1406* (2013.01); *F01N 2610/1413* (2013.01); *Y02T 10/24* (2013.01)

USPC .......... 137/375; 137/341; 137/558; 137/590; 137/574; 219/529

(58) Field of Classification Search
CPC ................ F16L 53/008; F02M 31/005; F01N 2610/1406
USPC .......... 137/558, 590, 341, 375, 574; 219/529
See application file for complete search history.

(56) References Cited

U.S. PATENT DOCUMENTS

| | | | |
|---|---|---|---|
| 4,684,786 A * | 8/1987 | Mann et al. .................. | 392/441 |
| 2006/0196263 A1* | 9/2006 | Stahlmann et al. ......... | 73/304 R |
| 2008/0149199 A1* | 6/2008 | Bleuel ...................... | 137/565.01 |
| 2009/0065508 A1* | 3/2009 | Haeberer et al. ............. | 220/562 |
| 2010/0025408 A1 | 2/2010 | Haeberer et al. | |

FOREIGN PATENT DOCUMENTS

| | | |
|---|---|---|
| DE | 20313163 U1 | 1/2004 |
| DE | 202004018697 U1 | 2/2005 |
| DE | 102005030954 A1 | 1/2007 |

(Continued)

OTHER PUBLICATIONS

PCT/EP2009/058554 International Search Report.

*Primary Examiner* — Atif Chaudry
(74) *Attorney, Agent, or Firm* — Michael Best & Friedrich LLP

(57) ABSTRACT

The invention relates to a tank for storing a liquid active ingredient for operating an aggregate of a motor vehicle, particularly a unit for post treatment of exhaust gases of the motor vehicle, comprising a container and at least one functional element (11, 18) extending into the container, wherein the functional element is provided with at least one agent (25, 26) for abrasion protection.

20 Claims, 2 Drawing Sheets

(56) References Cited

FOREIGN PATENT DOCUMENTS

| | | |
|---|---|---|
| DE | 102006027487 A1 * | 3/2007 |
| JP | 2005299441 | 10/2005 |
| JP | 2006144562 | 6/2006 |
| JP | 2007285210 | 11/2007 |
| JP | 2008115784 | 5/2008 |
| RU | 2135786 | 8/1999 |
| WO | 02/27280 A2 | 4/2002 |
| WO | 2008023021 | 2/2008 |
| WO | 2008/040591 | 4/2008 |

* cited by examiner

US 8,919,370 B2

TANK FOR STORING A LIQUID ACTIVE INGREDIENT

BACKGROUND OF THE INVENTION

The invention is based on a tank.

In motor vehicles having a combustion engine, the pollutant nitrogen oxide, inter alia, has to be reduced because of more stringent exhaust emission regulations. One method which is used is the "SCR" method—a selective catalytic reduction method, in which the pollutant nitrogen oxide is reduced to nitrogen and water with the aid of, for example, a liquid reducing agent. The reducing agent which is stored in a tank is conveyed by a conveying module, which is preferably arranged in the vicinity of the tank or on or in the tank, via a line from the tank to a metering module which is arranged in the region of the exhaust gas tract and commonly has a nozzle for the finely distributed injection of the reducing agent into the exhaust gas.

DE 102006027487 has already disclosed a tank for storing a liquid reducing agent of this type for use in an exhaust gas aftertreatment system of a motor vehicle, in particular for the selective catalytic reduction of nitrogen oxides, in which movably mounted components are submerged into the AdBlue, an aqueous urea solution, which is liquid above −11 degrees Celsius.

SUMMARY OF THE INVENTION

By contrast, the tank according to the invention has the advantage of, in a simple manner, avoiding chafing or abrasion at contact points of components located in the tank, which chafing or abrasion would otherwise occur as a consequence of sloshing movements of the active ingredient in the tank or when ice is formed in the tank.

The use of a fabric hose is particularly advantageous; said fabric hose can be fitted in a simple manner and is highly flexible and therefore does not have an effect on the overall rigidity of the parts to be protected. Axial positional orientation can easily take place since the fabric hose is automatically fixed in the axial direction by fastening points of the lines to be protected and of the suction lance.

In the event of a hose or fabric hose made of hard plastic being used, the coefficient of friction with respect to adjacent components is greatly reduced, thus effectively avoiding abrasion and wear.

The combination of a soft, flexible suction lance and of a hard fabric hose ensures reliable protection against abrasion while simultaneously maintaining the flexibility which is advantageous in the case of a medium which freezes.

An abrasion-protected suction lance is advantageously provided with a heating wire which can thaw the suction lance and the ice in the relatively close surroundings thereof.

If the abrasion protection has holes, as a braided hose or a fabric hose may have because of not being tightly knitted but rather merely being used as a spacer, a consistent thermal connection of a continuous liquid region of the active ingredient between the wall of a suction lance, which is provided with heating wires, and adjacent ice regions is ensured through the holes of the abrasion protection. The heating wire heat can therefore optimally thaw the ice around the suction lance. Furthermore, in such a "liquid gap" around the suction lance, an amount of runback which is recycled into the tank has the opportunity of flowing back again into the direct region around the heater. If the spacer were planar, heating in this direct form would not be provided and the active ingredient would be heated merely indirectly via the spacer. Furthermore, the amount thawed around the heater is effectively vented into the air space above the ice. Protection against chafing is advantageously provided, the protection at the same time ensuring intimate contact of the liquid with a heater integrated in the suction hose or the suction lance.

Further advantages emerge by means of the further features mentioned in the further dependent claims and in the description.

BRIEF DESCRIPTION OF THE DRAWINGS

Exemplary embodiments of the invention are illustrated in the drawing and are explained in more detail in the description below.

In the drawing

DETAILED SUMMARY

Figure 1:
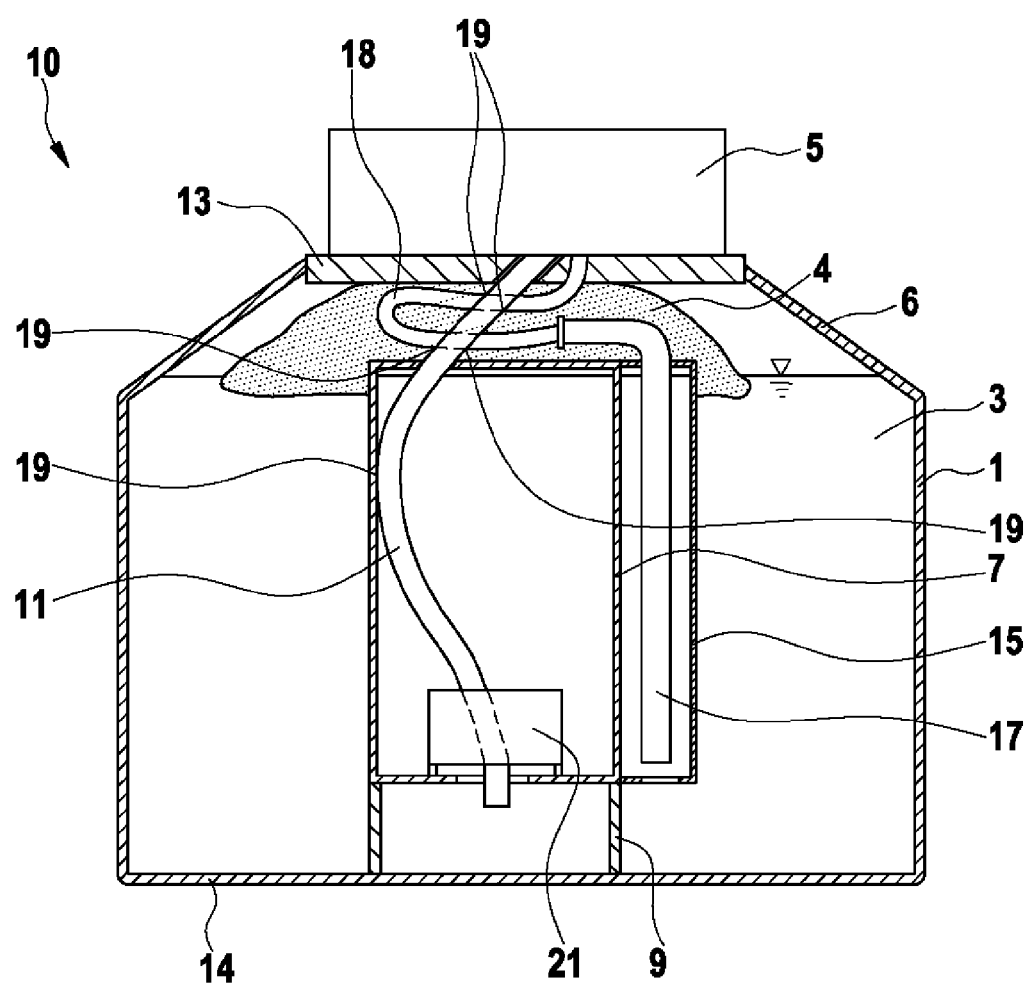
FIG. 1 shows a tank for storing an aqueous urea solution.

FIG. 1 shows a tank 10, the container 1 of which is filled with an aqueous urea solution as reducing agent 3. The reducing agent is illustrated in a frozen state in which a material embankment 4 consisting of frozen reducing agent has formed in the vicinity of a tank cover 13. A "slosh pot" 7 is arranged in the interior of the container 1. Said slosh pot stands on the tank base 14 via feet 9 and limits sloshing movements of the liquid active ingredient in the tank when the motor vehicle conveying the tank is in movement. Within the slosh pot, a suction line 11, which is referred to below as a suction lance, protrudes from the tank cover 13 into the interior of the tank to a region in the vicinity of the tank base 14. The suction lance is flexible and bendable and has a excess length, i.e. has a curvature and bears in a defined manner in the region of a contact point 19 against the inner wall of the slosh pot 7. On that side of the slosh pot which faces the tank base, the suction lance protrudes out of the slosh pot through an opening in the slosh pot. In said region, but within the slosh pot, the suction lance is surrounded by an electric heater 21 with electric supply lines (not illustrated specifically), which heater is preferably fastened to the slosh pot. In the upper tank region, the suction lance pierces the tank cover 13 and is actively connected to a conveying module 5 having, for example, a metering pump. A sensor container 15 which is arranged to the side of the slosh pot 7 is filled with active ingredient in an identical manner to the slosh pot and the remaining region of the container, and serves to protect a level sensor 17 located therein against the impact of ice. The level sensor 17 is connected to an electric line 18 which leads to the conveying module 5. The electric line 18 has an excess length analogously to the suction lance 11, i.e. said electric line runs in a coiled manner in the upper region of the tank in the vicinity of the tank cover before said line enters the conveying module through the tank cover. Without an acceptable outlay, the electric line 18 and the suction lance 11 cannot be prevented from touching at one or more contact points 19.

The reducing agent which freezes below −11° C. undergoes an increase in volume by approx. 10% during the liquid/solid phase transition. If the tank freezes from the tank base, the growth in volume of the reducing agent will arise at the surface. Due to this fact, the ice may exert a non-negligible pressure on the tank upper shell 6 or on the tank cover 13. Accordingly, the tank upper shell will undergo vertical deformation. The tank contains various components (heater 21, level sensor 17, suction lance 11) which are led out of the upper shell 6 of the tank via the separate cover 13. On account of the above-described ice pressure problem and for installation reasons, the feed lines for the components and the suction lance are designed with a corresponding excess length which has already been described. Said excess length takes up a defined, curved position in the completely fitted tank. Owing to said curvature, a possible vertical extension of the tank upper shell can be absorbed without the components being damaged. The suction lance 11 runs in the slosh pot 7, and, after the cover has been installed in the tank, is placed onto the wall of the slosh pot in a predetermined arch. The electric feed lines (not illustrated specifically) of the heater, the electric feed line 18 of the level sensor and the electric feed line of a temperature sensor (not illustrated specifically) are likewise placed onto adjacent components in the container interior in previously defined positions. In the case of the suction lance which bears against the slosh pot wall, abrasion may occur in the region of the contact point of suction lance/splash pot wall due to the accelerations which occur (for example on a rough road section). Similarly, as a consequence of contact with other components, chafing and therefore abrasion may occur at the electric lines. This is even more the case if the suction lance and the lines have, for example, an elastomer sheath which has a tendency to increased abrasion in the contact region.

Figure 2:
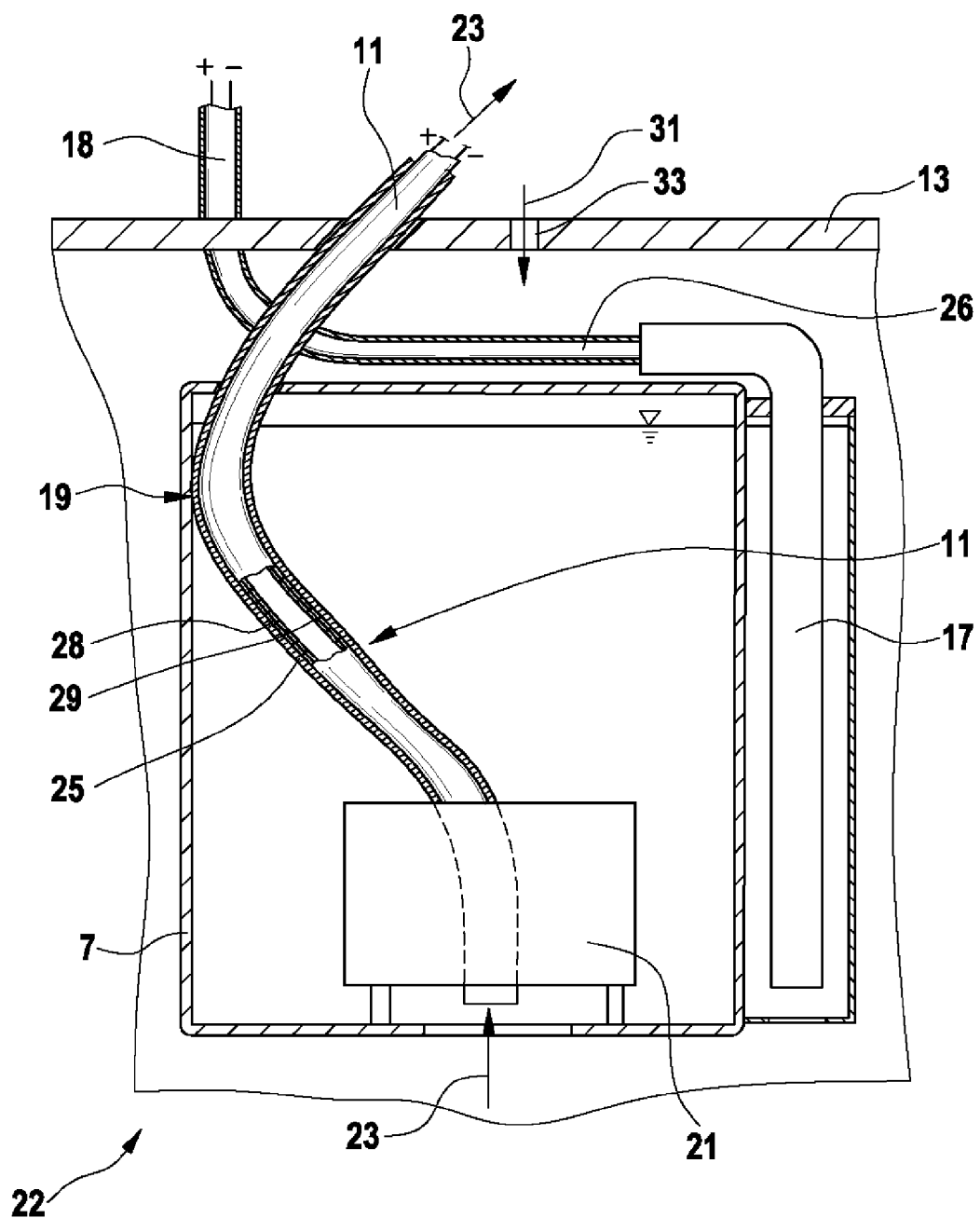
FIG. 2 shows an inner partial region of a tank of this type.

FIG. 2 shows a cutout 22 of a tank according to FIG. 1. The same components as illustrated in FIG. 1 are provided with the same reference numbers and are not described again. The arrow 23 on that region of the suction lance 11 which faces the tank base represents the suck-in direction in which active ingredient 3 is sucked in and transported via the conveying module 5 to a metering point or a metering module. The tank cover 13 has a lead through 33 for a run back of the liquid active ingredient, which run back is symbolized by an arrow 31. The electric line 18 of the level sensor 17 is covered by a braided protective hose or by a fabric hose 26. The suction lance 11 is also covered, at least in a region around the anticipated contact point 19, by an identical or similar fabric hose 25. In this detailed illustration of the tank, heating wires 28 and 29 which are depicted and lead to the heater 21 are arranged within the suction lance or on the outer wall of the suction lance, and the suction lance and heating wires are surrounded at any rate by the fabric hose 25.

The present invention shows how chafing or abrasion at the previously described contact points 19 can be avoided. Basically, spacers are incorporated. The lines and suction hoses affected by the abrasion are covered by a braided fabric hose which is customary in electrical engineering. Said fabric hose which is braided from a multiplicity of plastic fibers and bears tightly against the part to be protected takes on the function of the spacer here.

What is claimed is:

1. A tank (10) for storing a liquid active ingredient (3) for operating a unit of a motor vehicle, with a container (1) and at least one functional element (11, 28, 29; 18), which protrudes into the container, for influencing and/or measuring a physical variable of the active ingredient (3), characterized in that the functional element (11, 28, 29; 18) is provided with at least one means (25, 26) for protecting against abrasion in the event of mechanical contact (19) with an adjacent tank component (7, 11), the functional element being flexible and/or bendable and being placed onto the tank component, wherein the at least one means is a hose that has at least one hole such that the active ingredient can pass as far as an outer wall of the functional element which is held spaced apart from the adjacent tank component (7, 11) by the hose.

2. The tank as claimed in claim 1, characterized in that the functional element (11, 28, 29; 18) is arranged in such a manner that the functional element can come at least partially into contact with the active ingredient when the container is being filled with the active ingredient.

3. The tank as claimed in claim 1, characterized in that the at least one means (25, 26) is formed by a spacer.

4. The tank as claimed in claim 3, characterized in that the spacer is composed of hard plastic.

5. The tank as claimed in claim 1, characterized in that the hose is a fabric hose.

6. The tank as claimed in claim 1, characterized in that the at least one functional element has a suction line.

7. The tank as claimed in claim 1, characterized in that the at least one functional element has an electric line.

8. The tank as claimed in claim 7, characterized in that the electric line leads from an outer region of the container to an electric heater and/or to a measuring element.

9. The tank as claimed in claim 7, characterized in that the electric line forms the electric heater.

10. The tank as claimed in claim 7, characterized in that the electric line leads from an outer region of the container to a level sensor (17).

11. The tank as claimed in claim 1, characterized in that the adjacent tank component is formed by a slosh pot (7) arranged in the container (1), the slosh pot (7) being provided to limit the movement of the active ingredient (3) caused by movement of the motor vehicle.

12. The tank as claimed in claim 1, wherein the tank stores a liquid active ingredient (3) for operating an exhaust gas aftertreatment system of the motor vehicle.

13. The tank as claimed in claim 1, wherein the functional element (11, 28, 29; 18) protrudes into the container for influencing and/or measuring the level and/or the temperature of the active ingredient (3).

14. The tank as claimed in claim 1, characterized in that the at least one functional element has a flexible suction line.

15. A tank (10) for storing a liquid active ingredient (3) for operating a unit of a motor vehicle, with a container (1) and at least one functional element (11, 28, 29; 18), which protrudes into the container, for influencing and/or measuring a physical variable of the active ingredient (3), characterized in that the functional element (11, 28, 29; 18) is provided with at least one means (25, 26) for protecting against abrasion in the event of mechanical contact (19) with an adjacent tank component (7, 11), the functional element being flexible and/or bendable and being placed onto the tank component, wherein the at least one means is a fabric hose.

16. The tank as claimed in claim 15, characterized in that the functional element (11, 28, 29; 18) is arranged in such a manner that the functional element can come at least partially into contact with the active ingredient when the container is being filled with the active ingredient.

17. The tank as claimed in claim 15, characterized in that the at least one means (25, 26) is formed by a spacer.

18. The tank as claimed in claim 15, characterized in that the at least one functional element has a suction line.

19. The tank as claimed in claim 15, characterized in that the at least one functional element has an electric line.

20. The tank as claimed in claim 19, characterized in that the electric line leads from an outer region of the container to an electric heater and/or to a measuring element.

* * * * *